(12) United States Patent
Smith

(10) Patent No.: US 7,508,657 B1
(45) Date of Patent: Mar. 24, 2009

(54) PRIVACY-ENHANCING, GLARE-REDUCING DISPLAY SCREEN SHIELD

(76) Inventor: Steven R. Smith, 411 N. New River Dr., East, Apt. 2905, Ft. Lauderdale, FL (US) 33301

(*) Notice: Subject to any disclaimer, the term of this patent is extended or adjusted under 35 U.S.C. 154(b) by 173 days.

(21) Appl. No.: 11/729,249

(22) Filed: Mar. 28, 2007

Related U.S. Application Data

(60) Provisional application No. 60/799,157, filed on May 10, 2006.

(51) Int. Cl.
*H05K 5/00* (2006.01)

(52) U.S. Cl. ....................................................... 361/681

(58) Field of Classification Search ................. 361/681, 361/682, 683; 439/607, 367; 345/905; 348/818; 359/608
See application file for complete search history.

(56) References Cited

U.S. PATENT DOCUMENTS

| | | | |
|---|---|---|---|
| 4,934,434 A | 6/1990 | Schnebly et al. | |
| 5,325,970 A | 7/1994 | Dillon et al. | |
| 5,355,279 A * | 10/1994 | Lee et al. | 361/681 |
| 5,400,903 A * | 3/1995 | Cooley | 206/320 |
| 5,508,757 A * | 4/1996 | Chen | 348/818 |
| 5,660,220 A | 8/1997 | Ruan | |
| D385,543 S | 10/1997 | Phirippidis et al. | |
| 5,717,566 A | 2/1998 | Tao | |
| 5,769,378 A | 6/1998 | Correa | |
| 5,818,635 A | 10/1998 | Hohn et al. | |
| 5,877,896 A | 3/1999 | Gremban | |
| 5,905,546 A | 5/1999 | Giulie et al. | |
| 5,967,161 A * | 10/1999 | Neal | 135/19.5 |
| 6,046,754 A * | 4/2000 | Stanek | 345/169 |
| 6,084,711 A | 7/2000 | Duff | |
| 6,144,419 A | 11/2000 | Schmidt | |
| 6,302,546 B1 * | 10/2001 | Kordiak | 359/608 |
| 6,356,439 B1 | 3/2002 | Schmidt | |
| 6,827,262 B2 * | 12/2004 | McClure et al. | 235/386 |
| D514,582 S | 2/2006 | Dulberger | |
| 2003/0146654 A1 * | 8/2003 | Nguyen et al. | 297/463.2 |

* cited by examiner

*Primary Examiner*—Chandrika Prasad
(74) *Attorney, Agent, or Firm*—Gold & Rizvi, P.A.; H. John Rizvi; Glenn E. Gold

(57) ABSTRACT

A privacy-enhancing, glare-reducing display screen shield is provided including a pleated central portion, a first leg and a second leg on the edges of the pleated portion and generally parallel to the pleats, and mounting means on at least one leg to enable the display screen shield to be attached to an electronic device. The legs are movable relative to each other between a closed position and an open position in which the pleats radiate outwardly in a fan configuration, thus enabling the collapsible, transportable, attachable, and removable design of the display screen shield. The mounting means include adhesives, hook and loop fasteners, magnets, complementary mechanical means, or other removable means. Optionally, leg attachment bases that incorporate complementary mounting means and that attach to the electronic device may be provided. One or more display screen shields can be attached to the electronic device to furnish privacy or glare reduction.

20 Claims, 3 Drawing Sheets

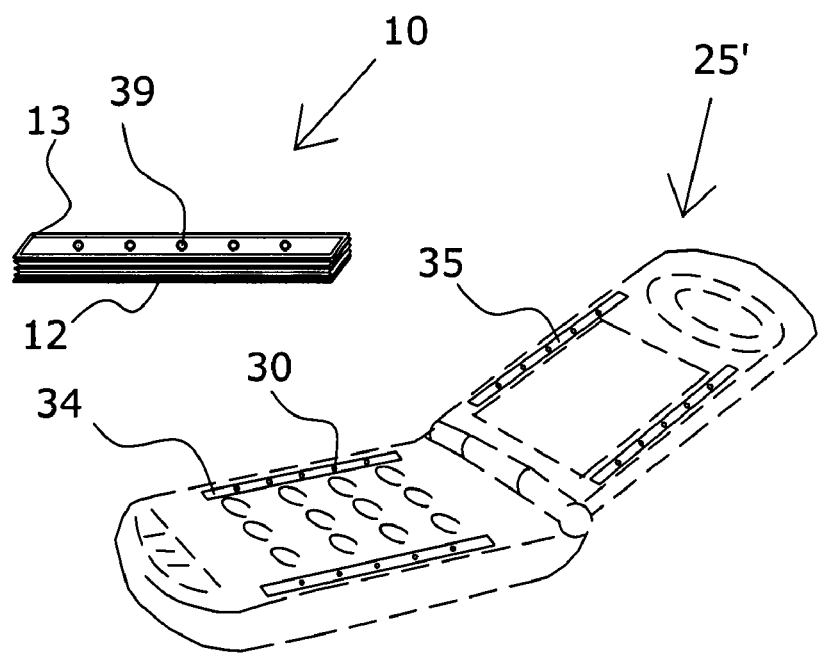
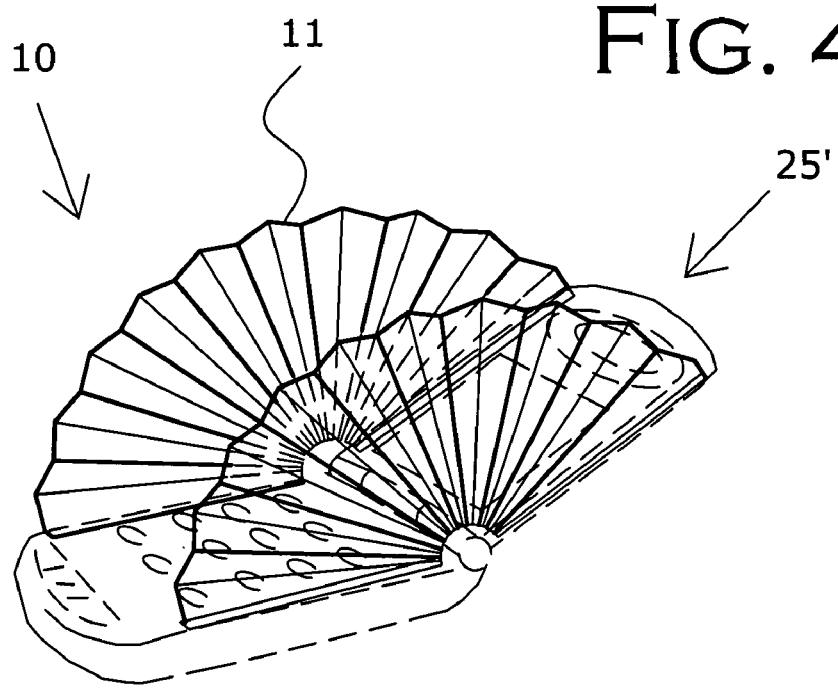

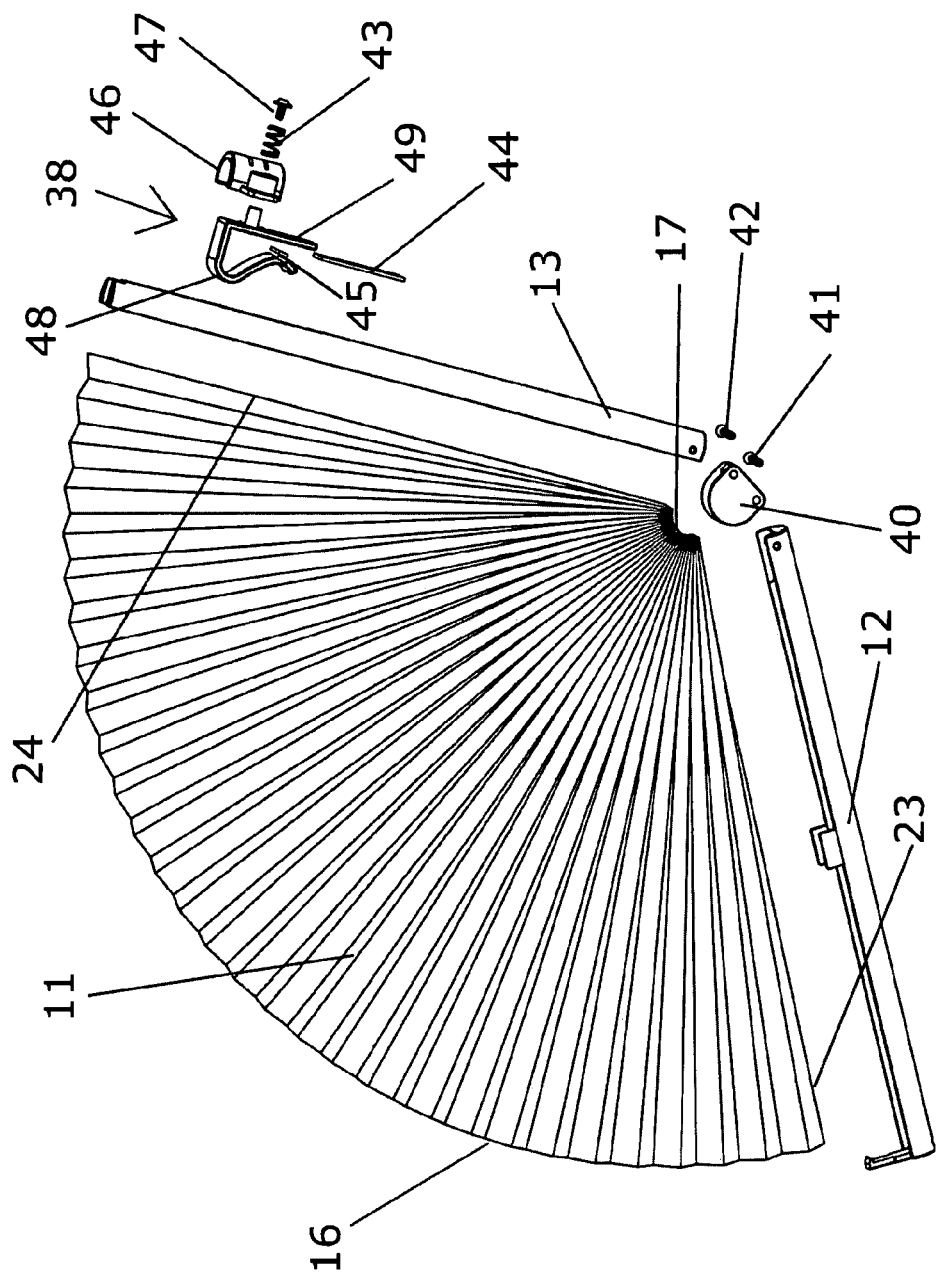

PRIVACY-ENHANCING, GLARE-REDUCING DISPLAY SCREEN SHIELD

CROSS-REFERENCE TO RELATED APPLICATION

This application claims the benefit of co-pending U.S. Provisional Patent Application Ser. No. 60/799,157, filed on May 10, 2006, which is incorporated herein in its entirety.

BACKGROUND OF THE INVENTION

1. Field of the Invention

The present invention relates generally to accessories for electronic devices, and more particularly, to a shield for display screens of electronic devices, including laptop or notebook computers, PDA's, video and audio players, cell phones, DVD players, computer monitors, and the like, configured to increase privacy and/or to reduce glare.

2. Description of the Prior Art

Consumers today operate a large number of consumer electronic devices on a daily basis, plus the need and desire to own and use these devices is growing exponentially. These devices are becoming more portable; for example, laptop computers now outsell desktops due to an increase in functionality and a decrease in price. These consumer electronic devices include not only laptop and notebook computers, but also PDA's, cell phones, portable gaming devices, handheld video devices, portable music players, DVD players, computer monitors and the like, that have display screens used for data input, data output, or device control. The huge number of portable electronic devices involved is exemplified by the 49 million laptops that were sold worldwide in 2004 (USA Today) and by the 200 million cell phones owned by about 70% of the population of the U.S. (CTIA—the Wireless Association).

These portable electronic devices have become a vital part of both business and personal life. Because their very purpose is to allow the user to be mobile, they must often be used in less than optimum conditions, where it would be advantageous to have a shield for the display screen.

One such troublesome condition is where there is a lack of privacy. Users may need to access private personal or business data while in close proximity to others, and therefore may need to shield the screen from viewers. This occurs on public means of transportation, such as planes, trains, buses and subways, as well as in public locations, such as restaurants, schools, offices, Internet cafés, and various other wireless Internet access points or hotspots. A user may need to access highly confidential information on his own personal electronic device, or may need to access private information while using public computers such as are often found in banks of machines in tight quarters at Internet cafés, libraries, school computer labs, or the like.

Another problematic situation occurs when the user needs to use the electronic device, but the intensity or direction of ambient light is not suitable. At times the display screen is difficult to view, for example, when using the computer in an outdoor environment. At these times, a shield is needed to reduce the ambient light intensity for better viewing or to prevent excessive glare on the display screen of the device.

While some methods of shielding the display screen are known in the art, they all have limitations. One prior system proposed an extendable shield as an integral part of a briefcase-like laptop computer case. The accordion-like shield extends from the side of the case top cover to the side of the case bottom, opening when the case opened and folding when the case closed. This shield is heavy, being embodied in a case. It is cumbersome, being always extended when the case is open, and it is non-removable. It does not provide flexible options for use, as both sides of the shield are always extended at the sides of the laptop case, whether required or not.

Another prior system provided an extendable shield as an integral part of the plastic external laptop housing enclosing the computer components. This pleated shield, extending from the outside edge of the keyboard area to the outside edge of the laptop display screen, could be folded into the top of the plastic housing, but not removed from the plastic housing. Because this shield is an integral part of the computer housing, it cannot be added to, or used with, a laptop already owned by a consumer.

In both above systems, the extendable shield is more likely to become worn or damaged than the more substantial rigid structural materials of the case or housing, but the shield is not removable or replaceable, being integrally part of an expensive case or housing. Neither can these shields be easily transported and installed on computers that are not owned by the consumer, but that are merely rented or borrowed for a time, such as public computers at Internet cafés, gaming centers, or libraries, where the need for privacy protection may be great. Moreover, it would be an advantage to allow the user to customize the appearance of his or her electronic device by providing a shield that can be quickly and easily exchanged for a different color, texture, or design.

Another method of shielding the display screen has been devised that includes a large, removable, flexible hood extending forward from all four sides of the laptop display screen. This causes the user to need to peer into a restricted, narrowed opening to view the screen, severely limiting view angles. Another hood attaches over the top of the laptop screen and provides partial shields on the screen sides. Neither of these two shields provides flexibility of use; for example, they do not provide the ability to attach a shield to only one side of the display screen. While both of these shields are removable and detachable, it would be advantageous to have a trimmer and more compact shield for transport, for storage, and to appear less obtrusive when in use.

Accordingly, there is an established need for a display shield that combines the advantages of being economical, transportable, flexible, removable, replaceable, lightweight, and compact, while being capable of enhancing privacy or reducing glare for the display screens of electronic devices owned by the user or of electronic devices rented or borrowed at public sites.

SUMMARY OF THE INVENTION

The present invention is directed to a display screen shield that is designed to attach to electronic devices to furnish privacy and/or glare reduction. The display screen shield includes a pleated central portion, a first leg and a second leg being disposed at the lateral edges of the pleated portion and generally parallel to the pleats, and mounting means on at least one leg to enable the display screen shield to be attached to an electronic device. The legs are movable relative to each other between a closed position and an open position in which the pleats radiate outwardly in a fan configuration, thus enabling the collapsible, transportable, attachable, and removable design of the display screen shield. The mounting means include adhesives, hook and loop fasteners, magnets, complementary mechanical means, or other devices that enable attachment and removal of the display screen shield from the electronic device. With the utilization of certain mounting means, leg attachment bases that attach to the electronic device and that incorporate complementary mounting means are provided. One or more display screen shields can be attached to the electronic device to furnish privacy or glare reduction.

An object of the present invention is to provide a display screen shield that is configured to provide privacy and/or glare reduction for electronic devices.

A further object of the present invention is to provide a display screen shield that can be adapted for use with a wide variety of electronic devices.

An additional object of the present invention is to provide a display screen shield that is flexible in use, allowing for one or more shields to be used as desired.

Another object of the present invention is to provide a display screen shield that is easy to attach and to detach.

An additional object of the present invention is to provide a display screen shield that is lightweight and easy to collapse and to transport.

A further object of the present invention is to provide a display screen shield that can be economically replaced.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 3 is a perspective view showing a second embodiment of the display screen shield of the present invention in the closed position with an application to a cell phone;

FIG. 4 is a perspective view showing the second embodiment of the display screen shield of the present invention as applied to a cell phone; and FIG. 5 is an exploded view showing the third embodiment of the display screen shield of the present invention.

Like reference numerals refer to like parts throughout the several views of the drawings.

DETAILED DESCRIPTION OF THE PREFERRED EMBODIMENTS

Shown throughout the figures, the present invention is directed toward a lightweight display screen shield and system for attachment to an electronic device that is capable of providing privacy or glare reduction for the screen of an electronic device. The display screen shield is configured to be easy to attach, detach, collapse, transport, and replace. The display screen shield of the present invention is preferably configured for use with any of a wide variety of electronic devices and display screen types. These electronic devices include laptop or notebook computers, PDA's, cell phones, portable gaming devices, handheld video devices, portable music players, DVD players, computer monitors, and the like. The display screen types include liquid crystal display (LCD), plasma displays, light-emitting diode displays (LED), nanocrystal or nanotube displays, surface-conduction electron-emitter display (SED), field emission display (FED), organic light-emitting diode (OLED), and the like.

Figure 1:
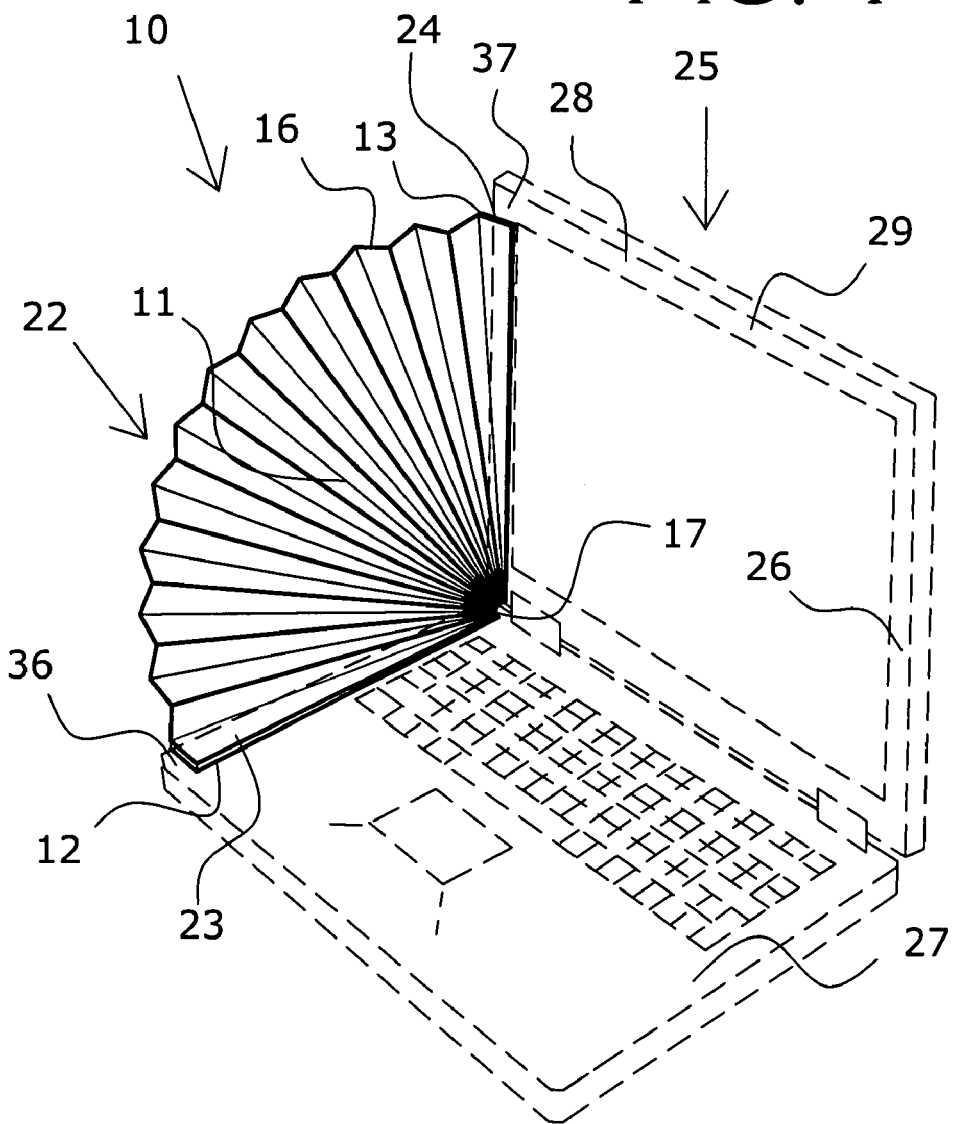
FIG. 1 is a perspective view showing a first preferred embodiment of the display screen shield of the present invention in the open position as applied to a laptop computer.

Referring now to FIG. 1, a display screen shield, shown generally as reference number 10, is illustrated in accordance with a preferred embodiment of the present invention. As shown, the display screen shield 10 includes a central pleated portion 22, a first leg 12, and second leg 13. Pleated portion 22 is constructed of a generally rectangular-shaped, foldable material that, during manufacturing, is configured to fold to form a plurality of latitudinal pleats 11, alternate ridges and channels running transversely across the material at right angles to its longitudinal edges 16, 17.

The first leg 12 is disposed at the first lateral edge 23 of pleated portion 22, and the opposing second leg 13 is disposed at the second lateral edge 24. Leg 12 and leg 13 are generally parallel to pleats 11, and are sufficiently rigid to enable pleated portion 22 to attach to an electronic device. Leg 12 and leg 13 may be a self-bound edge of pleated portion 22, they may be formed integrally or unitarily with pleats 11, or they may be formed separately of the same material or of different materials and then permanently attached to the material of pleats 11.

When the display screen shield 10 is in use, in the open position, leg 12 and leg 13 are moved in relation to each other to so that ends of one longitudinal edge of the pleats 11 are drawn together at pleated portion inner longitudinal edge 17, with the pleats 11 at the other longitudinal edge radiating outward to a generally arc-shaped peripheral longitudinal edge 16 in a fan configuration.

Figure 2:
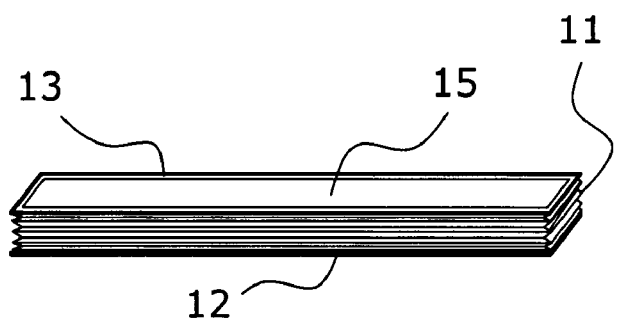
FIG. 2 is a perspective view showing a first preferred embodiment of the display screen shield of the present invention in the closed position.

When the display screen shield 10 is not in use, in the closed position, leg 12 and leg 13 are moved in relation to each other to be generally parallel, therefore pleats 11 are compressed together into a generally rectangular shape, as shown in FIG. 2. Thus, taking up minimal space, the display screen shield 10 is collapsible and easy to store and/or transport. Additionally, a mechanism to constrict the pleats 11 into their compressed state may be provided, such as a band, strap, or other mechanical constriction (not shown).

Leg 12 and leg 13 are configured with a mounting means to attach display screen shield 10 to the electronic device in the appropriate position to provide view and glare protection to the display from side angles. As shown in FIG. 1, the mounting means enables first leg 12 to attach and extend substantially along a first device edge 36 of electronic device 25 and second leg 13 to attach and extend substantially along a second device edge 37 of electronic device 25. For example, first device edge 36 can be the side of a laptop computer casing on the outside edge of the laptop keyboard and second device edge 37 can be the side of a laptop computer casing at the outside edge of the laptop display screen and. In a similar manner, a second display screen shield 10 (not shown) could be mounted on the opposite side of the electronic device, at attachment points 26 and 27. Additionally, a third display screen shield 10 (not shown) could be mounted with a generally horizontal placement on the upper edge of the electronic device 25, at attachment points 28 and 29 to provide a shield for the top of the screen.

The mounting means 15 includes adhesives, hook and loop fasteners commonly sold under the trademark Velcro®, magnets, suction cups, snaps, complementary mechanical means, or other removably attachable means. For example, in FIG. 2, mounting means 15 is shown as adhesive strips on leg 13 to allow display screen shield 10 to be quickly and easily attached to the electronic device. The adhesive strip of mounting means 15 is also disposed on leg 12 (not shown).

FIG. 3 and FIG. 4 illustrate a second preferred exemplary embodiment of the display screen shield 10 of the present invention. The second exemplary embodiment of the display screen shield 10 is substantially similar to, and functions in a similar manner to, the first exemplary embodiment of FIG. 1 to FIG. 2, but additionally provides one or more leg attachment bases 34, 35, and illustrates the use of a second display screen shield 10 on the electronic device, a cellular phone 25'. Thus, the second embodiment further demonstrates the variety of shapes, sizes, and types of the electronic device 25 with which the display screen shield 10 of the present invention may be utilized.

In the second embodiment, mounting means 15 comprises a complementary mounting means and the leg attachment bases 34, 35 incorporate complementary mounting means. Leg attachment bases 34, 35 can be permanently, semi-permanently, or removably attached to the electronic device 25. As illustrated, leg attachment base 34 can comprise mechanical complementary mounting means such as male snaps 30 and the mounting means on leg 12 can comprise mechanical mounting means such as female snaps 39. Alternatively, leg attachment base 34, 35 could comprise complementary mounting means such as hook or loop fasteners (not shown), and mounting means 15 on leg 12, 13 could comprise complementary hook or loop fasteners, (not shown).

Leg attachment base 34, 35 may further comprise an adhesive on its lower surface to allow it to be conveniently placed in the appropriate position on electronic device 25 to receive the mounting means 15 to secure the display screen shield to the electronic device 25. Optionally, leg attachment base 34, 35 could be formed integrally with the electronic device 25 at the time of manufacture in preparation for the utilization of the display screen shield 25 of the present invention with the electronic device 25 (not shown).

FIG. 5 illustrates a third preferred exemplary embodiment of the display screen shield 10 of the present invention. The third exemplary embodiment of the display screen shield 10 is substantially similar to, and functions in a similar manner to, the first exemplary embodiment of FIG. 1 to FIG. 2, but illustrates an additional type of mounting means, clip 38, and illustrates leg 12 and leg 13 preferably formed of a generally rigid material and joined to the foldable material of pleats 11, and illustrates the use of a single mounting means. The third embodiment also provides a pleat stabilization device 40 that is disposed at the pleated portion inner longitudinal edge 17.

The mounting means of the third embodiment is clip 38 with associated elements, clip fastener 46, first anti-slide mat 44, second anti-slide mat 45, compressed spring 43, and screw 47. Clip 38 is preferably sized and configured to secure the display screen shield 10 of the present invention to the top of the electronic device 25. One exemplary configuration of clip 38 is illustrated that has an open area allowing the insertion of the electronic device 25 defined by a generally S-shaped section 48 formed integrally with a flat section 49. Clip 38 is secured to the upper area of leg 13 via a clip attachment means, which may be any of numerous methods and mechanisms as are known in the art. Herein illustrated is one exemplary mechanism, the clip fastener 46 that holds clip 38 to leg 13 via the compressed spring 3 secured by screw 47, as well as tightening to help secure the display screen shield 10 to the electronic device 25.

Leg 12, leg 13, clip 38, and pleat stabilization device 40 are preferably formed of a generally rigid material, such as, for example, a polymer or metal. Leg 12 and leg 13 are configured to protect and to support lateral edge 23 and lateral edge 24, respectively. As illustrated leg 12 and leg 13 form a U-shaped channel that receives lateral edge 23 and lateral edge 24, respectively. Preferably leg 12 and leg 13 are securely attached at the time of manufacture to pleats 11, however, optionally, they can be removably attached to provide for replacement of pleats 11 by the consumer, if desired.

Leg 12 and leg 13 are configured to attach to pleat stabilization device 40. Pleat stabilization device 40 is preferably formed of a U-shaped channel which receives and secures longitudinal edge 17. As illustrated leg 12 and leg 13 may attach to pleat stabilization device 40 via screws 41, 42, although various attachment means as are known in the art are within the scope of the invention, such as, for example, brads, rivets, adhesives, clamps, or other fastening modalities. Pleat stabilization device 40 is configured to protect and to support the longitudinal edge 17 of pleats 11, as well as to join leg 12 to leg 13. Thereby display screen 10 is sufficiently strengthened and stabilized to be suspended by the single top mounting means, clip 38, being removably attached to the top edge of electronic device 25.

Optionally, a first anti-slide mat 44 and a second anti-slide mat 45 may be provided to further secure the display screen shield 10 to the top of the electronic device 25. First anti-slide mat 44 and second anti-slide mat 45 are preferably formed of a non-slip material, either natural such as rubber, or man-made such as a polymer characterized by gripping properties. First anti-slide mat 44 is disposed within the inner surface of the flat section 49 of clip 38 and second anti-slide mat 45 is disposed within the inner surface of the S-shaped section 48 of clip 38, thereby together gripping on both sides to control movement.

In all of the three embodiments, the material forming pleats 11 can be any material having sufficient rigidity to form pleats that can be provided in a substantially thin sheet, for example stiffened paper, woven or non-woven fabric, cardboard, plastic or other polymers, composite materials, or multi-layered materials. The material can block, absorb, or reflect light. The material provided can be decorative or aesthetically pleasing, allowing for a variety in color, texture, and design. Therefore, a user can quickly, easily, and economically replace a display screen shield 10 if an old one becomes worn or damaged, or simply for the aesthetic value of a different color, texture, or design to complement the electronic device.

Display screen shield 10 provides a light, compact, transportable design, which allows it to be easily stored in a bag, purse, pocket, or laptop case. The present invention can be flexibly configured as needed, by using one display screen or multiple display screens, to attach to one or more side edges or top edges of an electronic device. It is economical and can be added to any electronic device a consumer already owns.

When needed, the ends of the pleats 11 at one of the longitudinal edges are manually drawn together at pleated portion inner longitudinal edge 17, with the pleats 11 at the other longitudinal edge radiating outward to a generally circular peripheral longitudinal edge 16 in a fan configuration, as leg 12 and leg 13 are easily attached to the electronic device by the mounting means. Thus the unobtrusive display screen shield 10 at least partially conceals, protects, or shields the display screen, increasing privacy, reducing glare, and/or decreasing unwanted light. When not required further, display screen shield 10 can be easily detached and again collapsed for transport again by detaching leg 12 and leg 13 and collapsing the pleats 11 together into a generally rectangular shape.

From the foregoing, it will be apparent that the display screen shield 10 of the current invention provides a lightweight, economical, collapsible, and transportable shield for electronic devices that may be used singly or in pairs to increase privacy and decrease glare, while being easy to attach and to detach from the wide variety of electronic devices that it may be utilized with, such as laptop and notebook computers, PDA's, cell phones, portable gaming devices, handheld video devices, portable music players, DVD players, computer monitors, and the like.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

I claim:

1. A removable display screen shield for an electronic device and system for attachment, comprising:
    a pleated portion configured to fold into pleats, having an inner longitudinal edge generally perpendicular to said pleats, a peripheral longitudinal edge generally perpendicular to said pleats, a first lateral edge generally parallel to said pleats, and a second lateral edge generally parallel to said pleats;
    a first leg disposed on said first lateral edge of said pleated portion, said first leg having an upper portion;
    a second leg disposed on said second lateral edge of said pleated portion, wherein said first leg and said second leg are movable relative to each other between an open position and a closed position, wherein said open position is characterized by pleats extending from said inner longitudinal edge, said inner longitudinal edge being in a more contracted state, to radiate outward to said peripheral longitudinal edge, said peripheral longitudinal edge being in a more expanded state, to form a fan configuration, and wherein said closed position is characterized by said first leg and said second leg being positioned relative to each other in a generally parallel configuration; and
    a first screen mounting means disposed on said first leg, whereby said first leg is mounted onto said electronic device.

2. The removable display screen shield for an electronic device and system for attachment of claim 1, wherein said first screen mounting means comprises a clip, said clip having an outer section and an inner section defining an open area configured to allow the insertion of said electronic device.

3. The removable display screen shield for an electronic device and system for attachment of claim 2, further comprising a clip attachment means configured to secure said clip to said upper portion of said first leg.

4. The removable display screen shield for an electronic device and system for attachment of claim 3, further comprising a pleat stabilization device disposed between said first leg and said second leg and connecting said first leg to said second leg.

5. The removable display screen shield for an electronic device and system for attachment of claim 4, wherein said clip attachment means comprises a clip fastener and a compressed spring.

6. The removable display screen shield for an electronic device and system for attachment of claim 5, further comprising an anti-slide mat.

7. The removable display screen shield for an electronic device and system for attachment of claim 1, further comprising a second screen mounting means disposed on said second leg, whereby said second leg is mounted onto said electronic device, and wherein said first screen mounting means comprises an adhesive, and wherein said second screen mounting means comprises an adhesive.

8. The removable display screen shield for an electronic device and system for attachment of claim 1, further comprising:
    a first leg attachment base configured to attach to a first edge of said electronic device; and
    a second leg attachment base configured to attach to a second edge of said electronic device.

9. The removable display screen shield for an electronic device and system for attachment of claim 8, wherein said first leg attachment means comprises an adhesive and said second leg attachment bases comprise an adhesive, wherein said first leg attachment means and said second leg attachment means are secured to said electronic device.

10. The removable display screen shield for an electronic device and system for attachment of claim 8, wherein said first leg attachment base comprises a complementary magnetic mounting means, said second leg attachment base comprises a complementary magnetic mounting means, said first screen mounting means comprises a complementary magnetic mounting means, and said second screen mounting means comprises a complementary magnetic mounting means.

11. The removable display screen shield for an electronic device and system for attachment of claim 8, wherein said first leg attachment means comprises a first mechanical complementary mounting means and said second leg attachment means comprises a second mechanical complementary mounting means.

12. The removable display screen shield for an electronic device and system for attachment of claim 11, wherein said first mechanical complementary mounting means comprises multiple snaps, said second mechanical complementary mounting means comprises multiple snaps, said first screen mounting means comprises complementary snaps, and said second screen mounting means comprises complementary snaps.

13. The removable display screen shield for an electronic device and system for attachment of claim 11, wherein said first mechanical complementary mounting means comprises hook fasteners, said second mechanical complementary mounting means comprises hook fasteners, said first screen mounting means comprises complementary loop fasteners, and said second screen mounting means comprises complementary loop fasteners.

14. The removable display screen shield for an electronic device and system for attachment of claim 11, wherein said first mechanical complementary mounting means comprises loop fasteners, said second mechanical complementary mounting means comprises loop fasteners, said first screen mounting means comprises complementary hook fasteners, and said second screen mounting means comprises complementary hook fasteners.

15. A method for attaching and removing a display screen shield from an electronic device comprising the steps of:
    accessing the screen of said electronic device;
    attaching a first leg attachment base having a first mounting means to a first edge of said electronic device;
    attaching a second leg attachment base having a second mounting means to a second edge of said electronic device;
    attaching a third mounting means disposed on a first leg of a pleated portion of said display screen shield to said first mounting means; and
    attaching a fourth mounting means disposed on a second leg of a pleated portion of said display screen shield to said second mounting means, whereby said display screen shield is manipulated into a fan shape.

16. The method for attaching and removing a display screen shield from an electronic device of claim 15, further comprising the steps of:
- removing said fourth mounting means of said second leg of said display screen shield from said second mounting means;
- removing said third mounting means of said first leg of said display screen from said first mounting means; and
- moving said first leg in relation to said second leg in such a manner that said first leg becomes generally parallel to said second leg, thereby compressing said pleated portion of said display screen shield into compressed pleats.

17. The method for attaching and removing a display screen shield from an electronic device of claim 16, wherein said first mounting means, said second mounting means, said third mounting means, and said fourth mounting means comprise complementary hook and loop fastener components.

18. The method for attaching and removing a display screen shield from an electronic device of claim 17, wherein said first mounting means, said second mounting means, said third mounting means, and said fourth mounting means comprise complementary snap fastener components.

19. A method for attaching and removing a display screen shield from an electronic device comprising the steps of:
- accessing the screen of said electronic device;
- attaching a first mounting means over a top edge of said electronic device, said first mounting means being attached to said display screen shield;
- tightening a screw compressing a spring to secure the first mounting means to said top edge of said electronic device; and
- unfolding pleats of said display screen shield to form a fan shape.

20. The method for attaching and removing a display screen shield from an electronic device of claim 19, further comprising the steps of:
- untightening said screw to loosen said first mounting means from said top edge of said electronic device;
- removing said display screen shield from said top edge of said electronic device; and
- moving said first leg in relation to said second leg in such a manner that said first leg becomes generally parallel to said second leg, thereby compressing said pleated portion of said display screen shield into compressed pleats.

* * * * *